(12) United States Patent
Whitcomb

(10) Patent No.: US 10,798,881 B2
(45) Date of Patent: Oct. 13, 2020

(54) AIR ROOT PRUNING CONTAINER FOR GROWING A PLANT

(71) Applicant: Lacebark, Inc., Stillwater, OK (US)

(72) Inventor: Carl E. Whitcomb, Stillwater, OK (US)

(73) Assignee: LACEBARK, INC., Stillwater, OK (US)

(*) Notice: Subject to any disclaimer, the term of this patent is extended or adjusted under 35 U.S.C. 154(b) by 334 days.

(21) Appl. No.: 15/916,339

(22) Filed: Mar. 9, 2018

(65) Prior Publication Data
US 2019/0274262 A1 Sep. 12, 2019

(51) Int. Cl.
*A01G 9/02* (2018.01)
*B29C 49/48* (2006.01)

(52) U.S. Cl.
CPC .......... *A01G 9/021* (2013.01); *B29C 49/4823* (2013.01); *B29C 2049/4882* (2013.01)

(58) Field of Classification Search
CPC .......... A01G 9/02; A01G 9/021; A01G 9/026; A01G 9/0293; B65D 1/42; B65D 1/44; B65D 1/38; B65D 1/22; B65D 1/12; B65D 1/16
USPC ................................ 220/670, 671, 673, 675
See application file for complete search history.

(56) References Cited

U.S. PATENT DOCUMENTS

| 754,948 A | 3/1904 | White |
| 1,011,445 A | 12/1911 | Killion |
| 1,845,522 A | 2/1932 | Rowley |
| 2,405,056 A | 7/1946 | Rosenbloom |
| 2,615,486 A | 10/1952 | Marcus |
| 2,829,742 A | 4/1958 | Wallace |

(Continued)

FOREIGN PATENT DOCUMENTS

| CA | 2694274 A1 * | 1/2009 | ............... A01G 9/02 |
| DE | 839136 C * | 5/1952 | ............. A01G 9/021 |

(Continued)

OTHER PUBLICATIONS

Carl Erwin Whitcomb, "Effects of Root Competition Between Trees and Turfgrass", An Abstract of a Dissertation submitted to the Graduate Faculty in Partial Fulfillment of The Requirements for the Degree of Doctor of Philosophy, p. 1-3, 52.

(Continued)

*Primary Examiner* — Magdalena Topolski
*Assistant Examiner* — Morgan T Barlow
(74) *Attorney, Agent, or Firm* — Jeffrey Streets

(57) ABSTRACT

A plant container has a base and a sidewall upwardly extending from the base. The sidewall includes stepped sidewall sections that each include a plurality of generally vertical sidewall panels having successively larger cross-sectional dimensions with distance from the base and horizontal ledges extending between an upper edge of an adjacent lower one of the sidewall panels and a lower edge of an adjacent upper one of the sidewall panels. The sidewall further includes a plurality of ribs, where each rib is formed between two of the stepped sidewall sections and extends inwardly across the ledges of the two stepped sidewall sections. Each rib has two legs that extend apart to form an outwardly-directed open channel. Holes are formed in the sidewall for air root pruning, where each hole is formed directly between a ledge and a leg of one of the ribs.

19 Claims, 9 Drawing Sheets

(56) References Cited

U.S. PATENT DOCUMENTS

| | | | |
|---|---|---|---|
| 3,291,437 A | 12/1966 | Bowden et al. | |
| D215,122 S | 9/1969 | Satake | |
| 3,785,088 A * | 1/1974 | Guarriello | A01G 9/029 47/65.5 |
| 3,951,294 A | 4/1976 | Wilson | |
| 4,442,628 A | 4/1984 | Whitcomb | |
| 4,497,132 A | 2/1985 | Whitcomb | |
| 4,510,712 A | 4/1985 | Whitcomb | |
| 4,574,522 A | 3/1986 | Reiger et al. | |
| 4,716,680 A | 1/1988 | Whitcomb | |
| 4,753,037 A | 1/1988 | Whitcomb | |
| 4,730,953 A | 3/1988 | Tarko | |
| 4,793,097 A | 12/1988 | Whitcomb | |
| 4,920,695 A | 5/1990 | Garden | |
| 4,939,865 A | 7/1990 | Whitcomb et al. | |
| 5,099,607 A | 3/1992 | Lawton | |
| 5,241,784 A | 9/1993 | Henry | |
| 5,301,465 A | 4/1994 | Caferro | |
| 5,327,679 A | 7/1994 | Hawthorne | |
| 5,557,886 A | 9/1996 | Whitcomb | |
| 5,768,825 A | 6/1998 | Reiger | |
| 6,055,773 A * | 5/2000 | Yang | A01G 9/02 119/61.1 |
| 6,195,938 B1 | 3/2001 | Kay | |
| 6,266,921 B1 * | 7/2001 | Keskilohko | A01G 9/0295 47/86 |
| 6,311,443 B1 | 11/2001 | Allazetta | |
| 6,453,610 B2 | 9/2002 | Tonkin et al. | |
| 6,481,593 B2 | 11/2002 | Banhagel | |
| 6,862,840 B1 | 3/2005 | Single | |
| 6,874,278 B2 | 4/2005 | Felknor et al. | |
| 7,481,025 B2 | 1/2009 | Whitcomb | |
| 7,774,981 B2 | 8/2010 | Whitcomb | |
| 7,810,275 B2 | 10/2010 | Whitcomb | |
| 7,954,277 B2 * | 6/2011 | Cooley | A01G 9/021 47/65.5 |
| 8,033,048 B2 | 10/2011 | Whitcomb | |
| 8,109,398 B2 * | 2/2012 | Lewis | B65D 1/0223 215/381 |
| 8,113,370 B2 * | 2/2012 | Zhang | B65D 79/005 215/383 |
| 8,556,098 B2 * | 10/2013 | Peykoff | B65D 23/00 215/384 |
| 8,646,636 B2 * | 2/2014 | Sasaki | B65D 1/46 215/382 |
| 8,881,922 B2 * | 11/2014 | Schlies | B65D 1/0223 215/381 |
| 9,521,815 B2 * | 12/2016 | Panopoulos | A01G 9/02 |
| 2004/0237390 A1 * | 12/2004 | Clop | A01G 9/029 47/32.7 |
| 2005/0246960 A1 * | 11/2005 | Henry | A01G 9/021 47/73 |
| 2007/0256358 A1 * | 11/2007 | Schromm | A01G 9/02 47/66.6 |
| 2008/0190022 A1 * | 8/2008 | Whitcomb | A01G 9/0295 47/73 |
| 2011/0049086 A1 * | 3/2011 | Boiros | B65D 1/40 215/384 |
| 2012/0267381 A1 * | 10/2012 | Trude | B29C 49/4802 220/675 |
| 2016/0235016 A1 * | 8/2016 | Hsu | A01G 9/02 |
| 2018/0141697 A1 * | 5/2018 | Moon | B65D 21/0223 |
| 2018/0273247 A1 * | 9/2018 | Mooney | B65D 1/16 |

FOREIGN PATENT DOCUMENTS

| | | | | |
|---|---|---|---|---|
| DE | 102014100971 A1 * | 8/2014 | | A01G 9/02 |
| DE | 202015103621 U1 * | 9/2015 | | A01G 9/02 |
| FR | 2979797 A1 * | 3/2013 | | A01G 9/0291 |
| GB | 191324139 A * | 6/1915 | | B21D 31/04 |
| NL | 1006709 C1 * | 2/1999 | | A01G 9/02 |
| WO | WO9700005 | 1/1997 | | |
| WO | WO9721339 | 6/1997 | | |
| WO | WO0135722 A1 | 5/2001 | | |
| WO | WO-0180625 A1 * | 11/2001 | | A01G 9/02 |
| WO | WO-2019202496 A1 * | 10/2019 | | A01G 9/02 |

OTHER PUBLICATIONS

Carl E. Whitcomb, Eliot C. Roberts, and Roger Q. Landers, A Connecting Pot Technique for Root Competition Investigations Between Woody Plants or Between Woody and Herbaceous Plants, Ecology, vol. 50, No. 2, Early Spring 1969, p. 326-328.

Carl E. Whitcomb and Eliot C. Roberts, "Competition Between Established Tree Roots and Newly Seeded Kentucky Bluegrass", Agronomy Journal, vol. 65, Jan.-Feb. 1973, p. 126-129.

Ralph Reiger and Carl E. Whitcomb, "A Root Control System for Growing and Transplanting Trees", Ag Exp Sta Report, p. 843, 1983.

Carl E. Whitcomb, "Root Development of Trees Grown in Field-Grow Fabric Containers Following Transplanting", Okla. State U. Ag Exp. Sta Research Report, p. 872, 1985.

Jim Ward and Carl E. Whitcomb, Nursery Problems Solutions Through Research, Jun. 21, 1972, Experiment #13, "Effects of Time of Potting and Root Pruning on Growth and Root Distribution of Loquat Seedlings", p. 24-25.

Carl E. Whitcomb, "Growth of Carissa Grandiflora 'Boxwood Beauty' in varying media, containers and micronutrient levels", 9 pages, circa 1971.

Carl E. Whitcomb, Experiment #14, "Effects of Container Sidewall Porosity, Growing Media and Presence or Absence of Micronutrient Fertilizer on Root and Top Growth of *Carissa grandiflora* var. Boxwood Beauty", Nursery Problems Solutions Through Research, Jun. 5, 1971.

Randy E. Davis and Carl E. Whitcomb, "Effects of Propagation Container Size on Development of High Quality Seedlings", Reprint from the International Plant Propagators' Society, vol. 25, 1975.

Robert S. Birchell and Carl E. Whitcomb, "Effects of Container Design on Root Development and Regeneration", Nursery Research Field Day, Ag Exp Sta, OK State Univ, Oct. 1977, Research Report p. 760.

Robert D. Hathaway and Carl E. Whitcomb, "The Effects of Root Malformation During Propagation on Growth and Survival of Bur Oak", Nursery Research Field Day, Ag Exp Sta, OK State Univ, Oct. 1978, Research Report p. 777.

Sancho Dickinson and Carl E.Whitcomb, "Effects of Container Design on Root Quality", Nursery Research Field Day, Ag Exp Sta, OK State Univ, Oct. 1978, Research Report p. 777.

Elizabeth Williams and Carl E. Whitcomb, "Effects of Growing Media and Container Design on Growth of Tree Seedlings", Nursery Research Field Day, Ag Exp Sta, OK State Univ, Oct. 1979, Research Report p. 791.

John D. Gibson and Carl E. Whitcomb, "Producing Tree Seedlings in Square Bottomless Containers", Ornamentals South, Aug. 1980, p. 12-15.

Carl E. Whitcomb, "Effects of Container and Production Bed Color on Root Temperatures and Plant Growth", Nursery Research Field Day, Ag Exp Sta, OK State Univ, Oct. 1980, Research Report p. 803.

Steve Wall and Carl E. Whitcomb, "A Comparison of Commercial Containers for Growing Tree Seedlings", Nursery Research Field Day, Ag Exp Sta, OK State Univ, Oct. 1980, Research Report p. 803.

Carl E Whitcomb, "Growing Tree Seedlings in Containers", Bulletin 755 Jan. 1981 Agricultural Experiment Station Div of Ag, OK State Univ, p. 18.

Carl E. Whitcomb, "An "Easy" Way to Grow Specimen Trees in The Field", Nursery Research Field Day, Ag Exp Sta, OK State Univ, Oct. 1981, Research Report p. 818.

Carl E. Whitcomb, "A Vertical Air-Root-Pruning Container", Reprints—vol. 31 International Plant Propagators Society Combined Proceedings for 1981, p. 591-596.

Carl E. Whitcomb, "Improving Root System Quality", Reprint from Research Report p. 829 of the OK Ag Exp. Sta. Oct. 1982.

(56) References Cited

OTHER PUBLICATIONS

Ben Davis III and Carl E. Whitcomb, "Growing Pecan Seedlings in Containers", Reprint from Research Report p. 829 of the OK Ag. Exp. Sta. Oct. 1982.
Robert D. Hathaway and Carl E. Whitcomb, Nutrition and Performance of Container-Grown Japanese Black Pine Seedlings, J. Environ. Hort. 2 (1):9-12. Mar. 1984.
Robert D. Hathaway and Carl E. Whitcomb, "Container-Grown Pecan Seedlings Good Nutrition, Root Pruning Technique to Get Seedlings Off to Quick Start", Pecan South, Jan. 1985, p. 14-19.
Carl E. Whitcomb, Roots for The Future, The International Plant Propagators' Society, Combined Proceedings vol. 39, 1989, p. 170-173.
Dr. Carl Whitcomb, "The Rootmaker Container", Florida Nurseryman Oct. 1989, p. 23-29.
"Container designed to aid plant's root development", Nursery Manager, Apr. 1991, p. 22.
Carl E. Whitcomb, "Top Ten Polnts of Plant Propagation", Combined Proceedings International Plant Propagators' Society, vol. 48, 1988, p. 558-561.
Carl E. Whitcomb, "Avoiding the Staking Delemma", published in the International Plant Propagators Soc. Proceedings, vol. 50, 2000.
Carl Whitcomb, "Seedling Development: The Critical First Days©", Combined Proceedings International Plant Propagators' Society, vol. 51, 2001 p. 610-614.
Carl E. Whitcomb, Containers vs. Poly Bags—Which are better?, Reprinted from the Jan. 1, 1983, container production special issue of American Nurseryman.
Carl E. Whitcomb and Jerry D. Williams, "Stair-step Container for Improved Root Growth", HortScience 20(1) 66-67, 1985.
Dr. C. E. Whitcomb, "Effects of pot sizes on rooting of juniper cuttings", Jan. 15, 1974, p. 15, 73-74.
James D. Ward and Carl E. Whitcomb, "Nutrition of Japanese Holly during Propagation and Production", J. Amer. Soc. Hort. Sci 104(4)p. 523-526. 1979.
Carl E. Whitcomb, "Effect of Micronutrient Nutrition During Propagaton ON Container Plant Production", Reprints vol. 30 International Plant Propagators' Society Combined Proceedings for 1980, p. 468-473.
Carl E. Whitcomb, Allan Storjohann and William D. Warde, "Micromax—Micronutrients for Improved Plant Growth", Reprints vol. 30 International Plant Propagators' Society Combined Proceedings for 1980, p. 462-467.
Carl E. Whitcomb, Ralph Reiger and Mike Hanks, "Growing Trees in Wire Baskets", Journal of Ariculture 7 (6): Jun. 1981, p. 158-160.
Frank E. Babcock and Carl E. Whitcomb, "N—P—K Effects on Tree Seedling Growth", Agriculture Exp. Sta. OK State University Research Report p. 843, 1983.
Carl E. Whitcomb, "Why Large Trees Are Difficult to Transplant", Journal of Arboriculture 9(2): Feb. 1983, p. 57-58.
Michael Camey and Carl E. Whitcomb, "Effects of 2 Slow-Release Fertilizers on the Propagation and Subsequent Growth of 3 Woody Plants", J. Environ. Hort. 1(3):p. 55-58, Sep. 1983.
Bonnie Lee Appleton and Carl E. Whitcomb, "Effects of Container Size and Transplanting Date on The Growth of Tree Seedlings", J. Environ. Hort. 1(4):p. 89-93. Dec. 1983.
C. Chris Threadgill, Carl e. Whitcomb and Ronald McNew, "Effects of Propagation Container Dimensions and Media on The Growth of 4 Nursery Crops", J. Environ. Hort. 3(3):p. 126-131 Sep. 1985.
Whitcomb, Carl E., "Plant Production in Containers", Copyright 1984 by Carl E. Whitcomb, revised 1988.
Whitcomb, Carl E. "Plant Production in Containers II", Copyright 1984 by Carl e. Whitcomb, revised 1988 and 2003.
Carl Whitcomb PhD., "The Obsolete Taproot"; Landscape Contractor vol. 7, #8, pp. 22, 66, 67, Aug. 2004.
Carl E. Whitcomb and Andy C. Whitcomb; "Solutions for Pot-in-Pot Root Escape, Root Circling and Heat Shock at Harvest"; The International Plant Propagators Society Proceedings, 2004, vol. 54.

\* cited by examiner

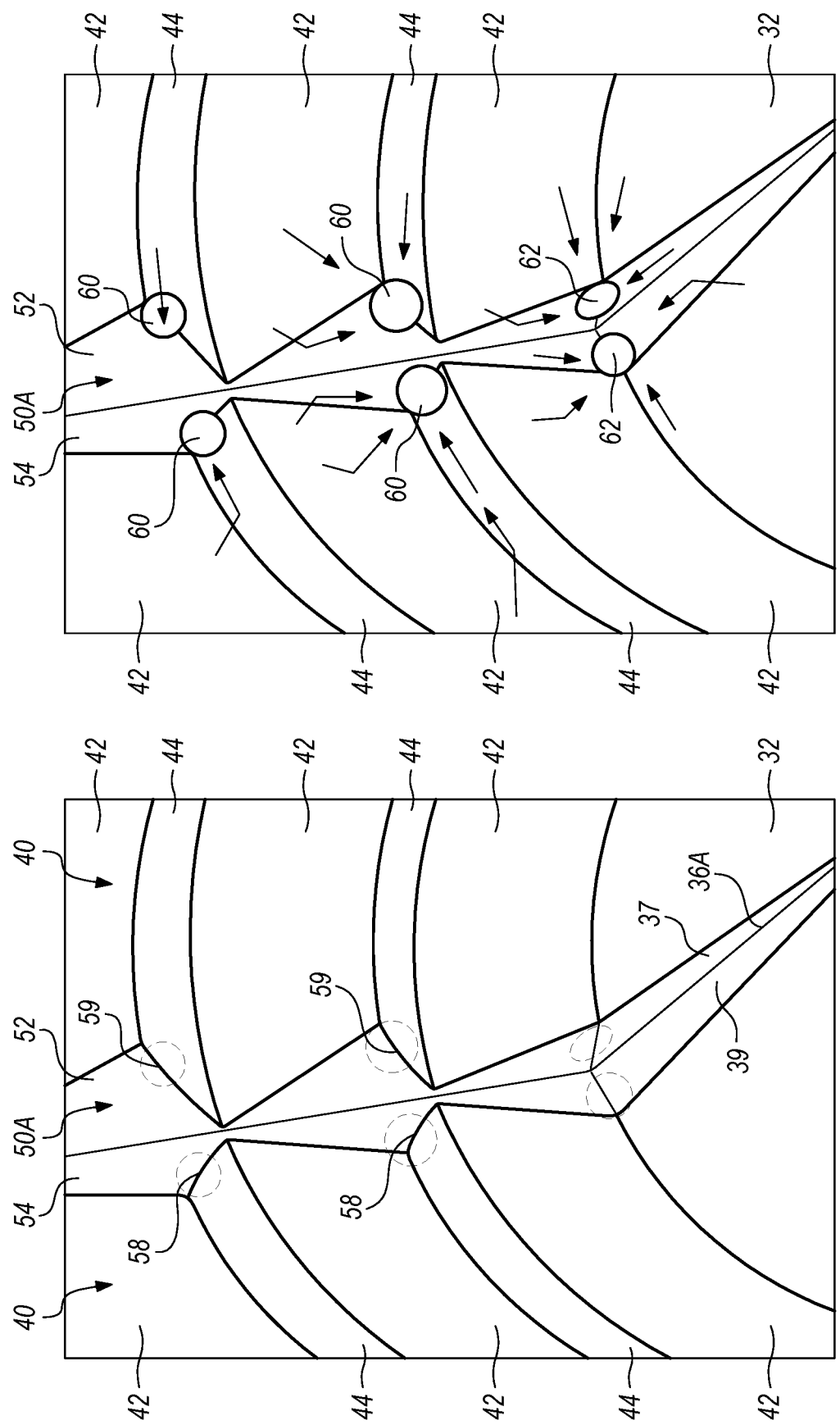

AIR ROOT PRUNING CONTAINER FOR GROWING A PLANT

BACKGROUND

The present invention relates generally to an air-root-pruning container for growing a plant.

Background of the Related Art

Landscape plants and other plants intended to be transplanted have, for some time, been grown out-of-doors in containers above ground. Container-grown plants can be grown at a faster rate than those grown in the field, and because the roots of container plants are not severed or otherwise disturbed when the plants are transplanted, such transplanting can take place at any time during the year, not just during the early spring as required with bare root or bagged nursery stock.

A variety of containers for growing plants intended to be transplanted have been developed and used previously, beginning with metal cans having drainage openings punched in the bottoms and progressing to modern plastic containers. However, plants grown in conventional containers, especially woody plants, commonly experience problems such as spiral root growth and generally downward root orientation with little lateral root development.

In some containers having open bottoms, the roots become air-pruned when they reach the bottom, wherein the portion of each root extending into the air is killed by desiccation. However, the root tips are still at the bottom of the container rather than being laterally directed along the sides. It has been shown that the root growth of container-grown plants after being transplanted primarily involves the extension of roots which were present in the container at the time of transplanting as opposed to the development of new roots. Consequently, the number and the position of root tips present at the time of transplanting is very important to the rapid establishment and ultimate survival of container-grown plants.

BRIEF SUMMARY

One embodiment provides an air root pruning container for growing a plant. The air root pruning container comprises a base and a sidewall upwardly extending from the base. The sidewall includes a plurality of stepped sidewall sections, each stepped sidewall section including a plurality of generally vertical sidewall panels having successively larger cross-sectional dimensions with distance from the base and a plurality of generally horizontal ledges extending between an upper edge of an adjacent lower one of the sidewall panels and a lower edge of an adjacent upper one of the sidewall panels. The sidewall further includes a plurality of ribs, each rib formed between two of the stepped sidewall sections and extending inwardly across the plurality of generally horizontal ledges of the two stepped sidewall sections, wherein each rib has two legs that extend apart to form an outwardly-directed open channel. Still further, the sidewall includes a plurality of holes formed in the sidewall, each hole formed directly between one of the ledges and one of the legs of one of the ribs.

BRIEF DESCRIPTION OF THE SEVERAL VIEWS OF THE DRAWINGS

FIGS. 6A and 6B are partial perspective views of the inside of the air root pruning container.

DETAILED DESCRIPTION

Figure 1:
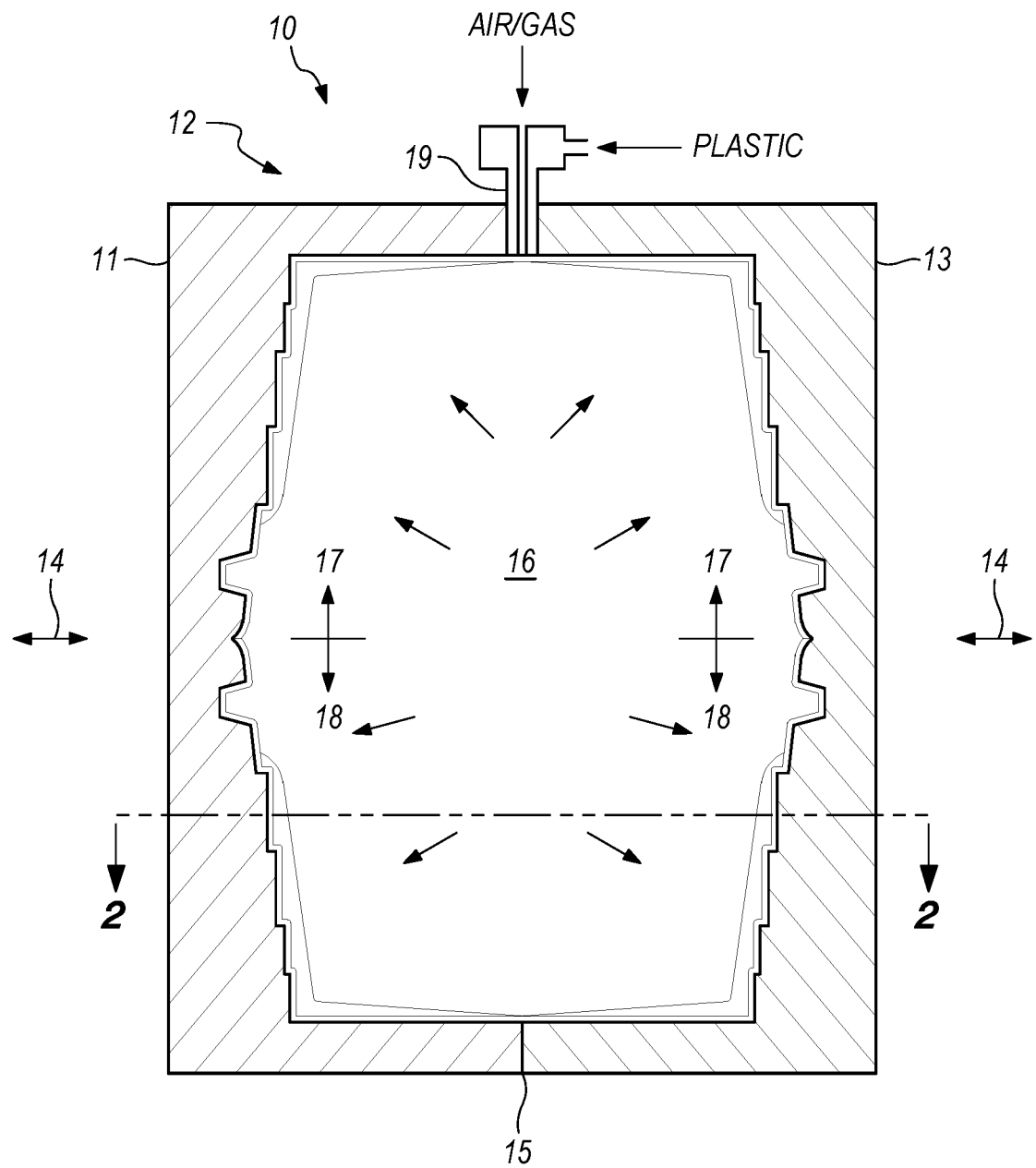
FIG. 1 is a cross-sectional side view of a blow molding apparatus for forming a workpiece that includes two plant containers.

One embodiment provides an air root pruning container for growing a plant. The air root pruning container comprises a base and a sidewall upwardly extending from the base. The sidewall includes a plurality of stepped sidewall sections, each stepped sidewall section including a plurality of generally vertical sidewall panels having successively larger cross-sectional dimensions with distance from the base and a plurality of generally horizontal ledges extending between an upper edge of an adjacent lower one of the sidewall panels and a lower edge of an adjacent upper one of the sidewall panels. The sidewall further includes a plurality of ribs, each rib formed between two of the stepped sidewall sections and extending inwardly across the plurality of generally horizontal ledges of the two stepped sidewall sections, wherein each rib has two legs that extend apart to form an outwardly-directed open channel. Still further, the sidewall includes a plurality of holes formed in the sidewall, each hole formed directly between one of the ledges and one of the legs of one of the ribs.

The plurality of ribs may include a plurality of asymmetric ribs, wherein each asymmetric rib has a first of the two legs that forms a first angle relative to the container sidewall section adjacent the first side of the asymmetric rib and a second of the two legs that forms a second angle relative to the container sidewall section adjacent the second side of the asymmetric rib. Although the container sidewall is curved in some embodiments, the angle of a leg relative to the container sidewall can be measured relative to a tangent line of the container sidewall at the point where the leg is formed to the sidewall section. In one option, the first and second angles are more than 20 degrees different. In a preferred option, the first angle is about 90 degrees. Furthermore, the second angle may be between about 20 and about 70 degrees.

Where the air root pruning container includes a plurality of asymmetric ribs, the plurality of asymmetric ribs may include a first asymmetric rib and a second asymmetric rib that has at least one of the first and second angles that is different than the first and second angles of the first asymmetric rib. Any number of different asymmetric ribs may be included, and those different asymmetric ribs may differ in their first and second angles. In a preferred option, the second asymmetric rib may be a mirror image of the first asymmetric rib.

Each of the holes is formed in the sidewall directly between one of the ledges and one of the legs of one of the ribs. In other words, each hole is located where one of the ledges intersects with one of the legs of one or the ribs. In a preferred option, each hole may include a first portion that extends into a given one of the horizontal ledges and a second portion that extends into a given leg of a given one of the ribs. Such a hole may be formed with a rotary drill bit directed at the intersection of the ledge and the leg of the rib. Locating each hole partially in the ledge and partially in the rib facilitates air root pruning of roots growing laterally along the ledge as well as roots growing downwardly along the rib.

Embodiments that include a first hole formed partially in a first leg of a given one of the ribs and a second hole formed partially in a second leg of the given one of the ribs will preferably have the first and second holes separated by a distance greater than 0.63 centimeters (¼ inch). More specifically, if the first and second holes are aligned on opposing legs of a given one of the ribs, the first and second legs of the given one of the ribs should extend apart sufficiently to separate the first and second holes by a distance greater than 0.63 centimeters (¼ inch). The distance between the first and second holes is more preferably greater than about 1.26 centimeters (¼ inch). The separation between aligned or adjacent holes facilitates air root pruning, while reducing the likelihood of a root exiting the container and its growth medium through the first hole and re-entering the container and its growth medium through the second hole.

The stepped sidewall sections include a plurality of generally vertical sidewall panels having successively larger cross-sectional dimensions with distance from the base and a plurality of generally horizontal ledges extending between an upper edge of an adjacent lower one of the sidewall panels and a lower edge of an adjacent upper one of the sidewall panels. The upper edge of the plurality of sidewall panels may define a pitch line that slopes outwardly away from a central axis of the container with increasing distance from the base. In one example, two or more of the generally vertical sidewall panels in each stepped sidewall section may have the same height, and two or more of the generally horizontal ledges may have the same depth. Each of the plurality of ribs preferably extends inwardly beyond the pitch line.

The plurality of generally vertical sidewall panels may each be positioned about a common center line. For example, the plurality of generally vertical sidewall panels may each have a radius about a central axis of the container, such that the successively larger cross-sectional dimensions of the generally vertical sidewall panels include a successively larger radius.

The base may include a plurality of radial ribs. In one embodiment, each radial rib in the base may form a continuation of one of the ribs in the sidewall, wherein each radial rib has first and second legs that extend apart to form an outwardly-directed open channel. Each of the radial ribs may also include a first hole in the first leg adjacent the sidewall and a second hole in the second leg adjacent the sidewall.

The air root pruning container is preferably formed by blow molding followed by the drilling of the plurality of holes. The air root pruning container may have a plane of symmetry, wherein the sidewalls do not include any backslopes relative to the plane.

Embodiments of the air root pruning container may further include a plurality of outwardly extending, hollow handles formed in the sidewall, wherein the handles are spaced about a perimeter of the sidewall at a distance from the base that is further than the upper-most one of the plurality of ledges.

FIG. 1 is a cross-sectional side view of a blow molding apparatus 10 for forming a workpiece 20 that includes two plant containers 17, 18. The mold 12 includes a left half 11 and a right half 13 that are moved together horizontally in the direction of the arrows 14. Accordingly, the two halves 11, 13 engage along an interface 15 to leave a cavity 16 in which a workpiece is formed. In the configuration shown, the cavity 16 includes an upper portion 17 that will form a first plant container and a lower portion 18 that will form a second plant container each time the blow molding apparatus 10 is used. Note that the upper portion 17 is inverted relative to the lower portion 18. Accordingly, the left side 11 of the mold 12 includes an impression of one half of each container portion 17, 18 and the right side 13 of the mold 12 includes an impression of the other half of each container 17, 18. The work piece from the blow molding apparatus 10 must be cut apart along the mid-section of the work piece.

The blow molding apparatus 10 delivers a softened plastic material between the two halves 11, 13 of the mold 12 and the mold is closed. The softened plastic material is delivered into the mold 12 through an annular chamber 19 as a tube about an air nozzle 20. When the mold 12 is closed (position shown), air or other gas is delivered into the tube of softened plastic under pressure to force the softened plastic outwardly to engage the surfaces of the mold 12.

Once the softened plastic has been expanded into the desired form defined by the mold 12, the workpiece is solidified by cooling the mold 12. The mold 12 may be cooled by flowing water through cooling channels (not shown) formed within the mold halves 11, 13. Then, after the mold has cooled, the mold halves 11, 13 are separated and the workpiece is removed.

Blow molding is advantageous, because there is only minimal outward pressure on the mold 12 and there is no inside tool or mold required. Furthermore, the mold 12 for a blow molding apparatus 10 can be machined of aluminum, which is less expensive, easier to manufacture, and more tolerant of temperature cycling than is injection molding. However, since the two halves of the mold are moved in opposite directions to open, any internal offsets must be shaped and positioned such that the part can be removed and is not torn or damaged as the mold opens. Specifically, there should be little or no backslopes or offsets to hinder or prevent release of the part from the mold. The asymmetric ribs described herein allow the air root pruning container to be blow molded and easily released from the mold as the two halves of the mold are separated to open.

Figure 2:
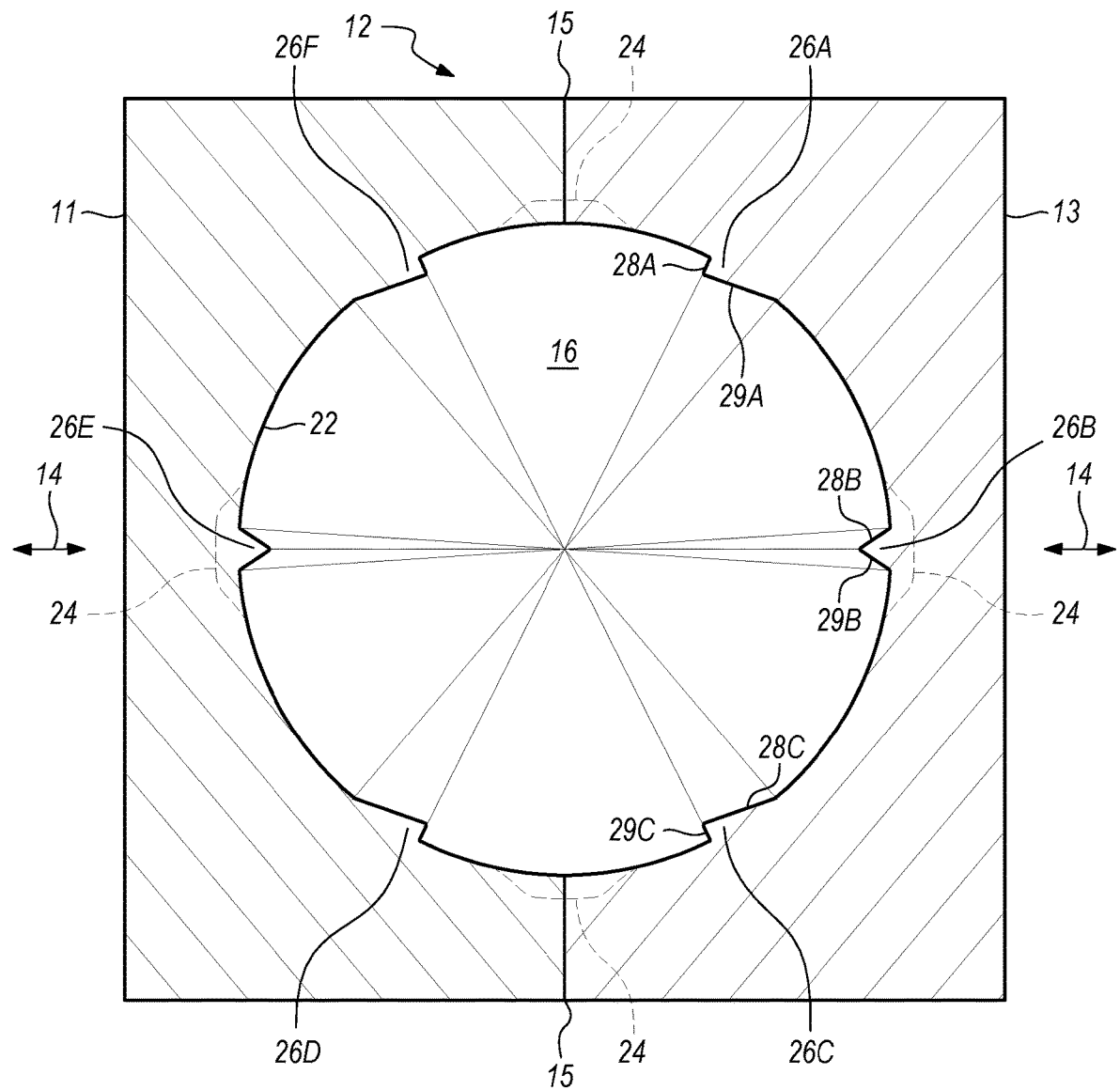
FIG. 2 is a cross-sectional of the blow mold taken along line 2-2 in FIG. 1.

FIG. 2 is a cross-sectional of the blow mold 12 taken along line 2-2 in FIG. 1. The two mold halves 11, 13 include interior surfaces 22 that define the cavity 16, which forms the shape of the resulting workpiece 20 (see FIG. 3). The mold halves 11, 13 show an example of the angular positioning of features 24 that will form handles and other features 26A-F that will form ribs around the perimeter of the cavity 16. With the features 24, 26A-F positioned and shaped as shown in FIG. 2, each mold half 11, 13 does not have any backslopes that would prevent opening of the mold 12 after the workpiece has been formed.

In the non-limiting example of FIG. 2, the blow mold will form four handles and six ribs. The four handles may be formed with even (90 degree) spacing about the circumference of the plant container, such as with two opposing handles formed along the interface of the mold halves and another two opposing handles formed in the middle of each mold half. The six ribs may be formed with even (60 degree) spacing about the circumference of the plant container. In a preferred configuration, certain ribs may be asymmetric and certain ribs may be symmetric, and each rib may be appropriately positioned, to avoid having backslopes at any point in the mold that would hinder both mold-halves from separating easily.

In the example shown, the features 26A, 26C, 26D, 26F will form asymmetric ribs and the features 26B, 26E will form symmetric ribs. The feature 26A has first side 28A (to form a first leg of a rib) that is perpendicular to the adjacent surface of the cavity 16 (which forms a sidewall section) (i.e., at a 90-degree angle to the tangent at the point of intersection). The feature 26A also has a second side 29A (to form a second leg of the rib) that is at an angle of about 20 degrees relative to the adjacent surface of the cavity 16 (which forms a sidewall section) (i.e., at a 20-degree angle to the tangent at the point of intersection). By contrast, the feature 26B has first side 28B (to form a first leg of a rib) that is angled relative to the adjacent surface of the cavity 16 (which forms a sidewall section) (i.e., at about a 60-degree angle to the tangent at the point of intersection) and a second side 29B (to form a second leg of the rib) that is also angled at the same angle relative to the adjacent surface of the cavity 16 (which forms a sidewall section) (i.e., at about a 60-degree angle to the tangent at the point of intersection).

Note that the feature 26A will form an asymmetric rib that is different than the asymmetric rib formed by the feature 26C. While the angle of the side 28C may be the same as that of side 29A and the angle of the side 29C may be the same as that of side 28A, the orientation of the feature is reversed. Both features avoid any backslopes that would hinder or prevent the mold halves 11, 13 separating in the direction of the arrows 14. Furthermore, the features 26A, 26C form asymmetric ribs that are mirror images of the asymmetric ribs formed by the features 26F, 26D relative to the plane defined by the interface 15 between the two mold halves 11, 13. The plant container is not limited to any particular number of ribs and is not limited to any particular number of asymmetric ribs that are different.

While the mold 12 will form a plant container having a horizontal cross-section that is generally circular, except for the ribs and the handles, a mold could be made to form a plant container having a horizontal cross-section that is ovoid or a regular polygon, such as a rectangle or hexagon.

Figure 3:
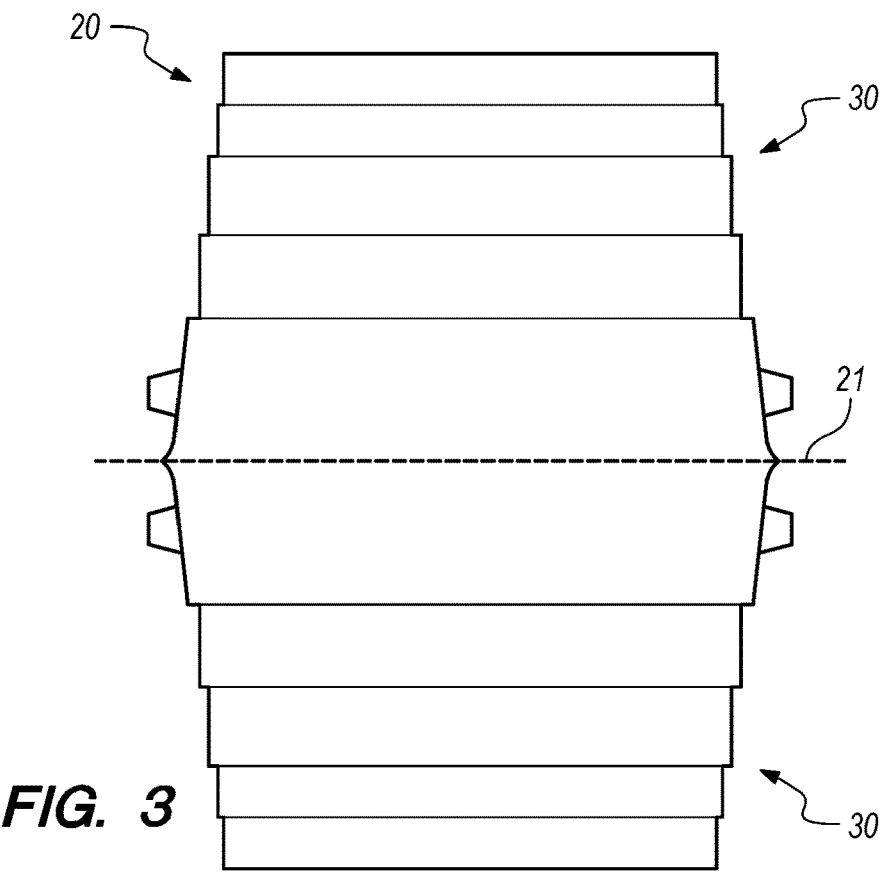
FIG. 3 is a side view of the workpiece that is formed by the blow molding apparatus.

FIG. 3 is a side view of a workpiece 20 that is formed by the blow molding apparatus 10. The workpiece 20 may be cut in half along the dotted line 21 to separate the workpiece into two plant containers 30.

Figure 4:
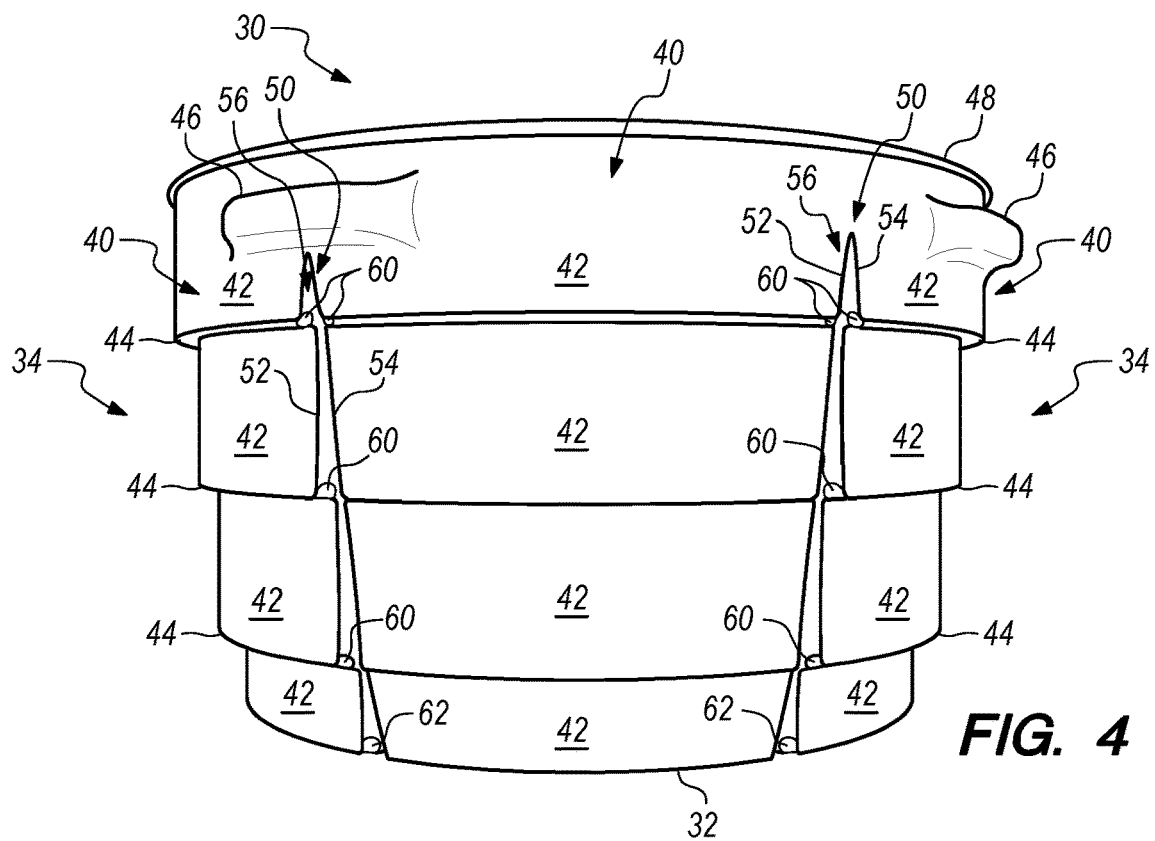
FIG. 4 is a perspective view of the outside of an air root pruning container for growing plants.

FIG. 4 is a perspective side view of the outside of an air root pruning container 30 for growing plants. The container 30 includes a base 32 and a sidewall 34 upwardly extending from the base 32. The sidewall includes a plurality of stepped sidewall sections 40 and a plurality of ribs 50, where each rib 50 is formed between two of the stepped sidewall sections 40. Each stepped sidewall section 40 includes a plurality of generally vertical sidewall panels 42 having successively larger cross-sectional dimensions with distance from the base 32 and a plurality of generally horizontal ledges 44 extending between an upper edge of an adjacent lower one of the sidewall panels 42 and a lower edge of an adjacent upper one of the sidewall panels 42. Each rib 50 extends inwardly into the container 30 across the plurality of generally horizontal ledges 44 of the two adjacent stepped sidewall sections 40. Furthermore, each rib 50 has two legs 52, 54 that extend apart to form an outwardly-directed open channel 56.

A plurality of holes 60 are formed in the sidewall in specific locations to facilitate air root pruning. For example, each hole may be formed directly between one of the ledges 44 and one of the legs 52, 54 of one of the ribs 50. In one option, each hole may be drilled such that the hole removes a portion of the horizontal ledge and a portion of the rib. In a further option, each hole may be positioned so that about one half of the hole removes a portion of the horizontal ledge and about one half of the hole removes a portion of the rib. The holes are preferably positioned and sided to avoid removing any of the curved outer wall of the container. For example, the diameter of each hole is preferably no greater than the depth of the ledge.

A further hole 62 is preferably drilled into each of the two legs of each radial rib in the base, with this hole located along the sidewall and base. The hole in each leg preferably has a diameter that is about half the height of one leg of the hollow base rib. The remaining upper portion of each radial rib will strengthen the container.

Handles 46 are formed near the top of the container 30, but below an upper rim 48. The outwardly-extending handles 46 are preferably hollow, forming a cavity that opens inwardly. However, since the handles are toward the top of the container 30, the cavity in the handles 46 is not expected to engage many roots or have any significant effect on root development of a plant.

Figure 5A:
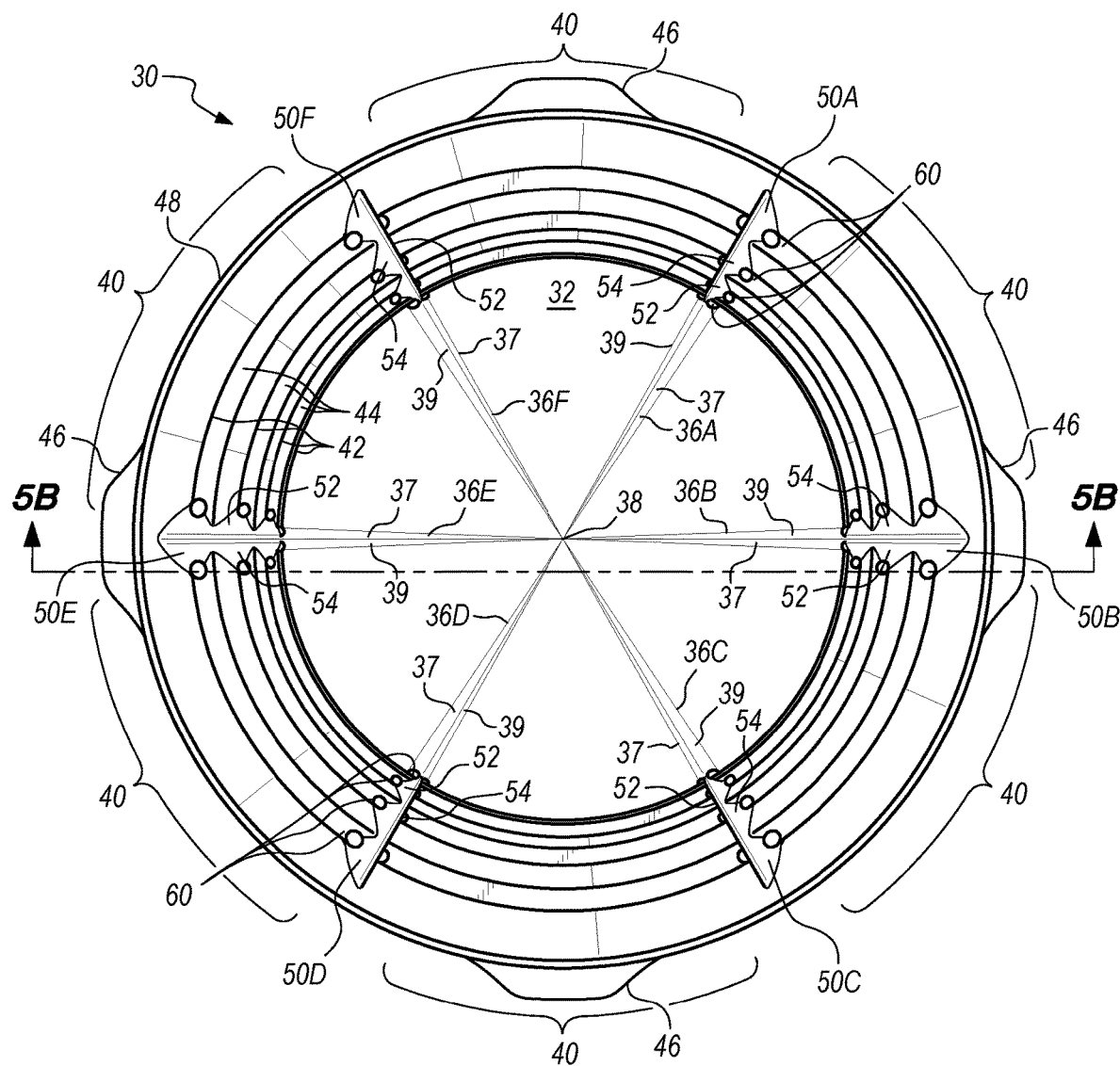
FIG. 5A is a top view of the air root pruning container of FIG. 4.

FIG. 5A is a top view of the air root pruning container 30 of FIG. 4. In this top view, the handles 46 are shown spaced about the perimeter of the container and extending outwardly beyond the rim 48. The base 32 includes radial ribs 36A-F that extend radially outwardly from a central axis 38 of the container. Each of the radial ribs 36A-F preferably include two legs 37, 39 that extend apart to form an outwardly-directed (downwardly-directed) open channel.

The sidewall of the container extends upwardly from the base 32 and includes a plurality of stepped sidewall sections 40 (six shown) and a plurality of ribs 50A-F (six shown), where each rib 50A-F is formed between two of the stepped sidewall sections 40. Each stepped sidewall section 40 includes a plurality of generally vertical sidewall panels 42 having successively larger cross-sectional dimensions with distance from the base 32 and a plurality of generally horizontal ledges 44 extending between an upper edge of an adjacent lower one of the sidewall panels 42 and a lower edge of an adjacent upper one of the sidewall panels 42. Each rib 50A-F extends inwardly toward the middle of the container 30 and also extends across the plurality of generally horizontal ledges 44 of the two adjacent stepped sidewall sections 40. Furthermore, each rib 50A-F has two legs 52, 54 that extend apart to form an outwardly-directed open channel. Preferably, each rib 50A-F aligns with a radial rib 36A-F and forms a continuous rib structure with legs 52, 54 aligned with legs 37, 39, respectively, to form continuous leg structures.

A plurality of holes 60 are formed in the sidewall in specific locations to facilitate air root pruning. For example, each hole (48 holes are shown) is formed directly between one of the ledges 44 and one of the legs 52, 54 of one of the ribs 50.

Figure 5B:
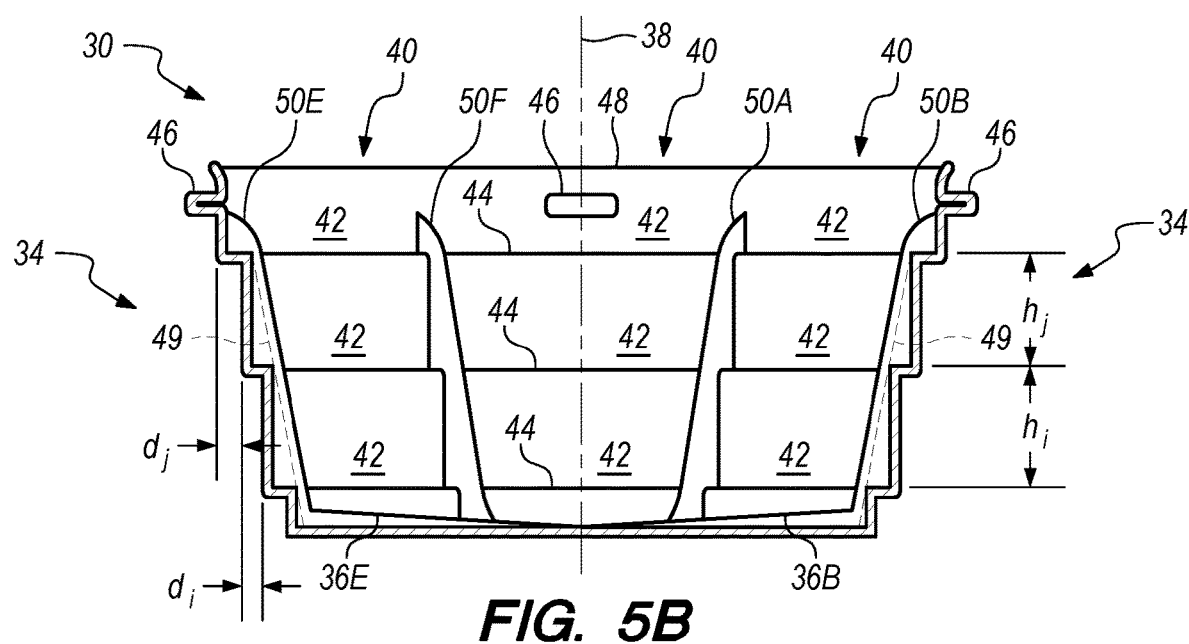
FIG. 5B is cross-sectional view of the air root pruning container taken along line 5B-5B in FIG. 5A.

FIG. 5B is cross-sectional side view of the air root pruning container 30 taken along line 5B-5B in FIG. 5A. This view shows how the ribs 50A, 50B, 50E, 50F extend across each of the ledges 44 and how the radial ribs 36E, 36B extend upward. Furthermore, the ribs 50E, 50B are shown formed as a continuous structure with the radial ribs 36E, 36B. Still further, the sidewall panels 42 and the ledges 44 are shown to define a pitch line 49 (shown in dashed lines) that represents the overall pitch of the steps in the stepped sidewall sections between the ribs. The pitch is affected by the depth of the ledges 44 (for example, depth $d_i$ and depth $d_j$) as well as the height of the sidewall panels 42 (for example, height $h_i$ and height $h_j$). The ribs 50A-F preferably extend inwardly beyond the pitch line 49, as shown, and the legs of each rib are formed to their respective adjacent stepped sidewall section.

FIGS. 6A and 6B are partial perspective views of the inside of the air root pruning container. FIG. 6A illustrates the relationship between the stepped sidewall sections 40 and the rib 50A, which is an asymmetric rib. The stepped sidewall sections 40 extend upward from the base 32 and include a plurality of sidewall panels 42 and a plurality of ledges 44. The sidewall panels 42 are substantially vertical, wherein each panel 42 has a greater radius than the panel 42 below it (in the direction of the base 32). The ledges 44 are substantially horizontal and connect one sidewall panel to the next to form steps on the inside of the container rising from the base 32.

In FIG. 6A, the ledges 44 of a first sidewall section 40 (as shown on the left of the rib 50A in FIG. 6A) intersect the leg 54 of the rib 50A at each location 58 and the ledges 44 of a second sidewall section 40 (as shown on the right of the rib 50A in FIG. 6A) intersect the leg 52 of the rib 50A at each location 59. Furthermore, the rib 50A and the radial rib 36A form a continuous rib structure. Accordingly, the rib structure extends across the corner between the base 32 and the sidewall section 40.

In FIG. 6B, holes 60 for air-root pruning have been formed in the container sidewall at the locations 58, 59 (see FIG. 6A) wherein the ledges 44 intersect the legs 52, 54 of the rib 50A. Each hole 60 has a first portion that extends along the horizontal ledge 44 away from the rib 50A and a second portion that extends up the rib 50A from the horizontal ledge 44. Where the hole is formed by drilling into the plant container, about half of the drilled hole may remove material from the horizontal ledge adjacent the intersection of the rib and the ledge, and about half of the drilled hole may remove material from the rib above the intersection of the rib and the ledge. Furthermore, holes 62 are formed in the legs of the rib structure aligned with the base 32 and the lowest sidewall panel 42.

The holes formed on opposing sides of a rib should have sufficient spatial separation to allow effective air-root pruning due to the air gap between the two sides of each rib. This configuration facilitates air root pruning while also allowing a root ball to slide right out of the container without restriction.

With air root pruning holes 60 formed in the container sidewall as described, roots (illustrated as un-numbered arrows in FIG. 6B) of a plant growing in the plant container will grow out, intersect the horizontal ledge 44, and be directed either left or right. If the holes 60 were formed entirely in the horizontal ledge, some roots would avoid the opening and continue extending. Accordingly, holes formed solely in the horizontal ledge 44 may have only minor effectiveness for air root pruning. By forming the holes partially in the horizontal ledge and partially in the vertical wall of the rib, roots that are not sufficiently affected by geotropism to enter the part of the hole in the horizontal ledge will extend onward to enter the part of the hole formed in the rib and will be effectively air root pruned. Roots may also enter the hole after extending along a sidewall panel 42 of a leg of the rib 50A.

Furthermore, the ribs 50A, 36A must be sufficiently wide so that a root cannot exit the plant container through a first hole in a first side of the rib, then re-enter the plant container through a second hole in a second side of the same rib. The distance between the holes on opposing sides of a rib is preferably at least 0.63 centimeters (¼ inch), more preferably at least 1.26 centimeters (½ inch), and may be even greater.

Figure 7A:
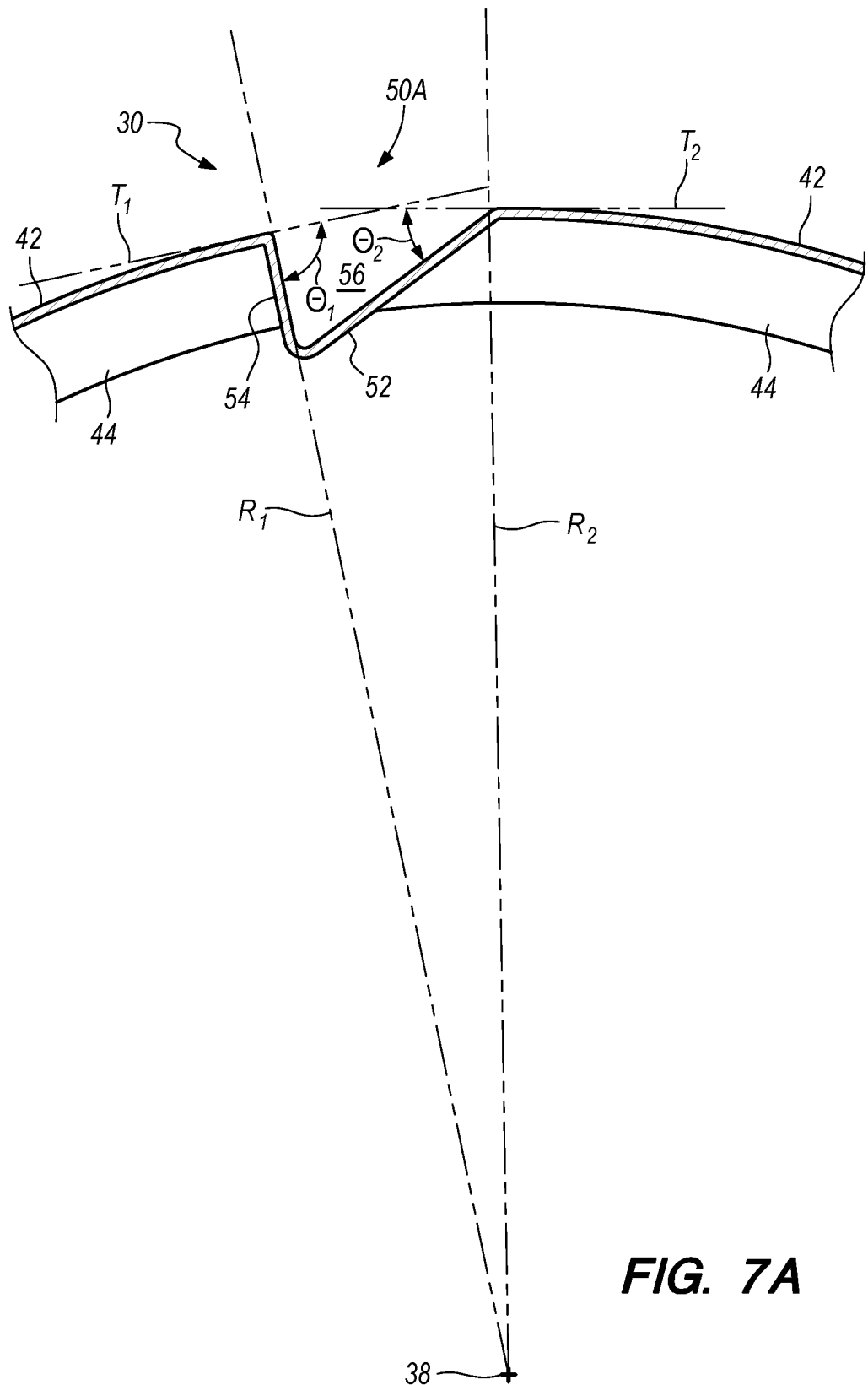
FIG. 7A is a schematic diagram illustrating the shape of an asymmetric rib formed in the sidewall of the air root pruning container.

FIG. 7A is a schematic diagram illustrating the shape of an asymmetric rib 50A formed in the sidewall of the air root pruning container 30. In this example, the asymmetric rib 50A has a first leg 54 that is near perpendicular to the container sidewall and a second leg 52 that slopes out from the inner edge of the rib toward the container sidewall. Note how the legs 54, 52 form the hollow or open channel 56. The legs 54, 52 are separated by a sufficient distance to form an outward-facing air space between the two legs of the rib that facilitate air root pruning.

The first leg 54 may be characterized by an angle $\theta_1$ between the leg 54 and a line $T_1$ that is tangent to the container sidewall at the point where the leg 54 connects with the (left) sidewall panel 42. In this illustration, the angle $\theta_1$ is about 90 degrees. Similarly, the second leg 52 may be characterized by an angle $\theta_2$ between the leg 52 and a line $T_2$ that is tangent to the container sidewall at the point where the leg 52 connects with the (right) sidewall panel 42. In this illustration, the angle $\theta_1$ is about 25 degrees.

Figure 7B:
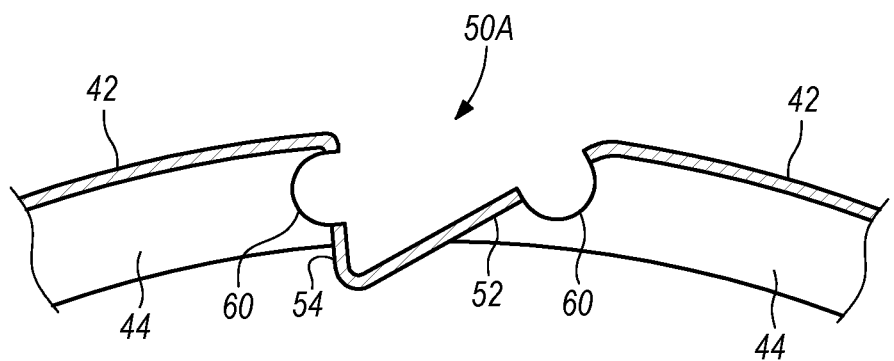
FIG. 7B is a schematic diagram illustrating the location of holes in a sidewall relative to the asymmetric rib of FIG. 7A.

FIG. 7B is a schematic diagram illustrating the location of air root pruning holes 60 relative to the asymmetric rib of FIG. 7A. The holes 60 are partially formed in the ledges 44 and partially formed in the legs 52, 54 of the rib 50A.

Figure 8B:
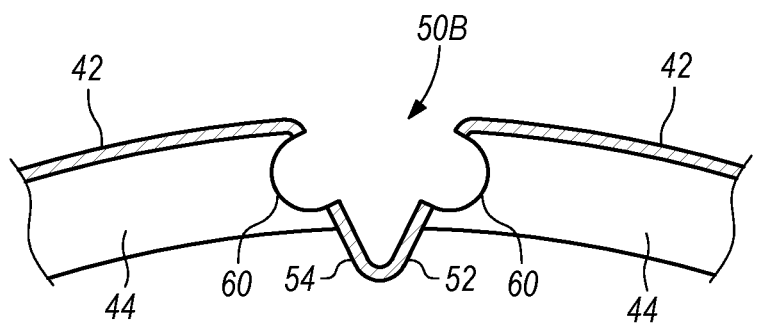
FIG. 8B is a schematic diagram illustrating the location of holes in a sidewall relative to the symmetric rib of FIG. 8A.
Figure 8A:
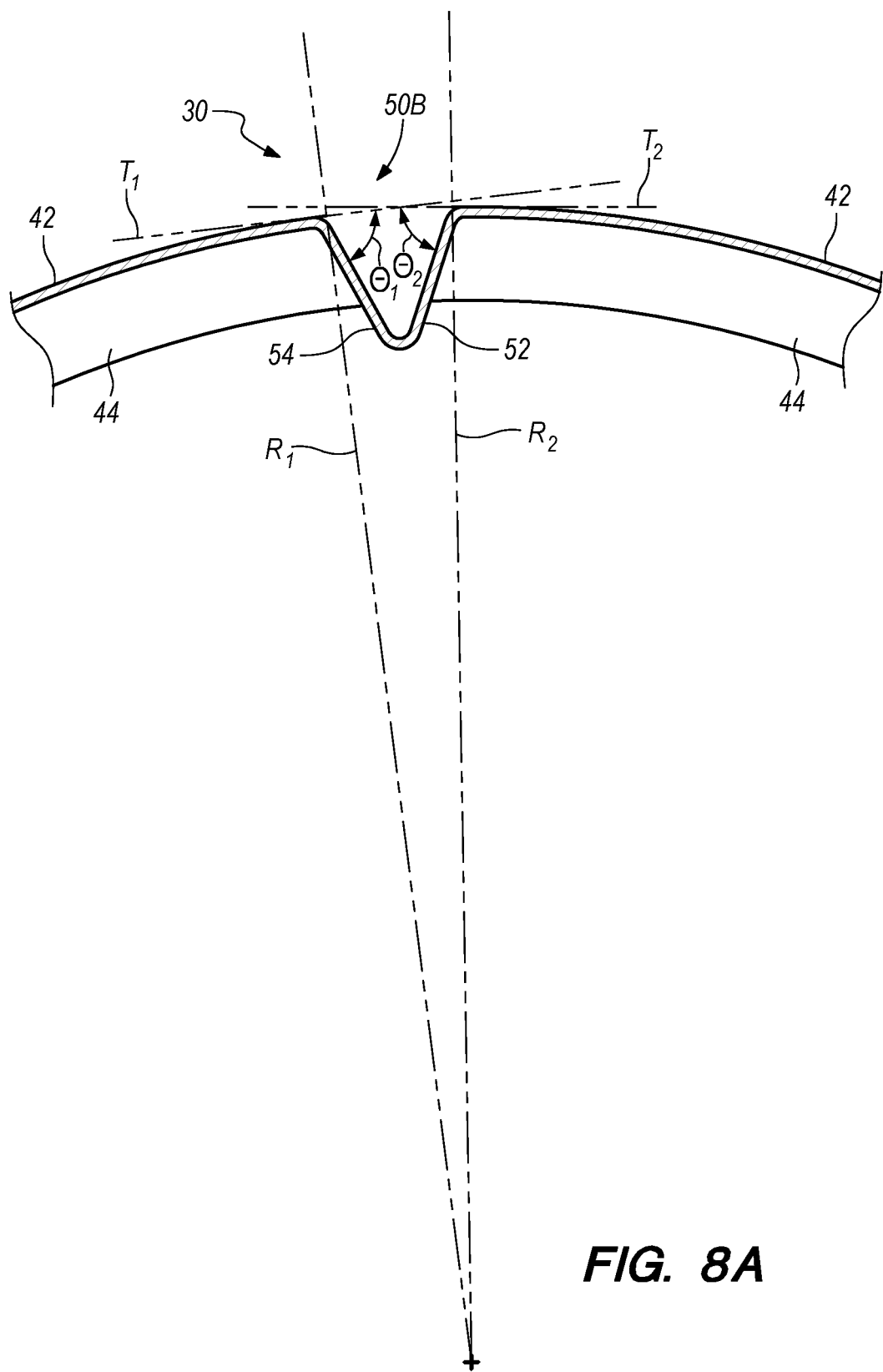
FIG. 8A is a schematic diagram illustrating the shape of a symmetric rib formed in the sidewall of the air root pruning container.

FIG. 8A is a schematic diagram illustrating the shape of a symmetric rib 50B formed in the sidewall of the air root pruning container 30. The diagram here is similar to that of FIG. 7A, except that the rib 50B is symmetric. Accordingly, the first leg 54 may be characterized by an angle $\theta_1$ between the leg 54 and a line $T_1$ that is tangent to the container sidewall at the point where the leg 54 connects with the (left) sidewall panel 42, and the second leg 52 may be characterized by an angle $\theta_2$ between the leg 52 and a line $T_2$ that is tangent to the container sidewall at the point where the leg 52 connects with the (right) sidewall panel 42. For a symmetric rib, such as rib 50A, the angle $\theta_1$ will be equal to the angle $\theta_2$, although the angles may vary. As shown, both angles $\theta_1$ and $\theta_2$ are about 70 degrees.

FIG. 8B is a schematic diagram illustrating the location of air root pruning holes 60 relative to the symmetric rib of FIG. 8A. The holes 60 are partially formed in the ledges 44 and partially formed in the legs 52, 54 of the rib 50A.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. An air root pruning container for growing a plant, comprising:
    a base; and
    a sidewall upwardly extending from the base, the sidewall including:
        a plurality of stepped sidewall sections, each stepped sidewall section including a plurality of generally vertical sidewall panels having successively larger cross-sectional dimensions with distance from the base and a plurality of generally horizontal ledges extending between an upper edge of an adjacent lower one of the sidewall panels and a lower edge of an adjacent upper one of the sidewall panels, wherein the upper edge of the plurality of sidewall panels define a pitch line that slopes outwardly away from a central axis of the container with increasing distance from the base;
        a plurality of ribs, wherein each rib is formed between two of the stepped sidewall sections, wherein each rib has two legs that extend apart to form an inwardly-directly continuous ridge, and wherein the continuous ridge of each rib is disposed inwardly beyond the pitch line across the plurality of generally horizontal ledges of the two stepped sidewall sections; and
        a plurality of holes formed in the sidewall, each hole formed directly between one of the ledges and one of the legs of one of the ribs.

2. The air root pruning container of claim 1, wherein the plurality of ribs includes a plurality of asymmetric ribs, wherein each asymmetric rib has a first of the two legs that forms a first angle relative to the container sidewall section adjacent the first side of the asymmetric rib and a second of the two legs that forms a second angle relative to the container sidewall section adjacent the second side of the asymmetric rib.

3. The air root pruning container of claim 2, wherein the first and second angles are more than 20 degrees different.

4. The air root pruning container of claim 2, wherein the first angle is about 90 degrees.

5. The air root pruning container of claim 2, wherein the second angle is between about 20 and about 70 degrees.

6. The air root pruning container of claim 2, wherein the plurality of asymmetric ribs include a first asymmetric rib and a second asymmetric rib, wherein the second asymmetric rib has first and second angles that are different than the first and second angles of the first asymmetric rib.

7. The air root pruning container of claim 2, wherein the plurality of asymmetric ribs include a first asymmetric rib and a second asymmetric rib, and wherein the second asymmetric rib is a mirror image of the first asymmetric rib.

8. The air root pruning container of claim 1, wherein the plurality of holes formed in the sidewall include a first hole formed partially in a first leg of a given one of the ribs and a second hole formed partially in a second leg of the given one of the ribs, wherein the first and second holes are aligned across the given one of the ribs, and wherein the first and second legs of the given one of the ribs extend apart to separate the first and second holes by a distance greater than 0.63 centimeters (¼ inch).

9. The air root pruning container of claim 1, wherein the continuous ridge of each rib runs parallel to the pitch line across the plurality of generally horizontal ledges of the two stepped sidewall sections.

10. The air root pruning container of claim 1, wherein two or more of the generally vertical sidewall panels in each stepped sidewall section have the same height, and wherein two or more of the generally horizontal ledges have the same depth.

11. The air root pruning container of claim 1, wherein the plurality of generally vertical sidewall panels are each positioned about a common center line.

12. The air root pruning container of claim 1, wherein the plurality of generally vertical sidewall panels have a radius about a central axis of the container.

13. The air root pruning container of claim 12, wherein the successively larger cross-sectional dimensions of the generally vertical sidewall panels include a successively larger radius.

14. The air root pruning container of claim 1, wherein each hole includes a first portion that extends into a given one of the horizontal ledges away from a given one of the ribs and a second portion that extends into the given one of the ribs away from the given one of the horizontal ledges.

15. The air root pruning container of claim 1, further comprising:
    a plurality of outwardly extending, hollow handles formed in the sidewall, wherein the handles are spaced about a perimeter of the sidewall at a distance from the base that is further than the upper-most one of the plurality of ledges, and wherein each of the hollow handles forms a cavity that opens inwardly.

16. The air root pruning container of claim 1, wherein the base includes a plurality of radial ribs, wherein each radial rib in the base forms a continuation of one of the ribs in the sidewall, and wherein each radial rib has first and second legs that extend apart to form an outwardly-directed open channel.

17. The air root pruning container of claim 16, wherein each of the radial ribs includes a hole in the first leg adjacent the sidewall and a hole in the second leg adjacent the sidewall.

18. The air root pruning container of claim 1, wherein the plurality of holes are drilled in the sidewall after the base and sidewall are formed by blow molding.

19. The air root pruning container of claim 1, wherein the container has a plane of symmetry, and wherein the sidewalls do not include any backslopes relative to the plane.

* * * * *